Jan. 7, 1958      H. I. RITTLE      2,819,099
FLANGE UNION FITTING WITH CONTRACTIBLE LINED WEDGE
Filed June 12, 1953
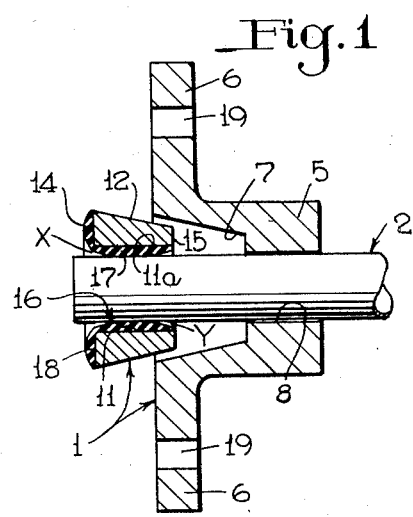
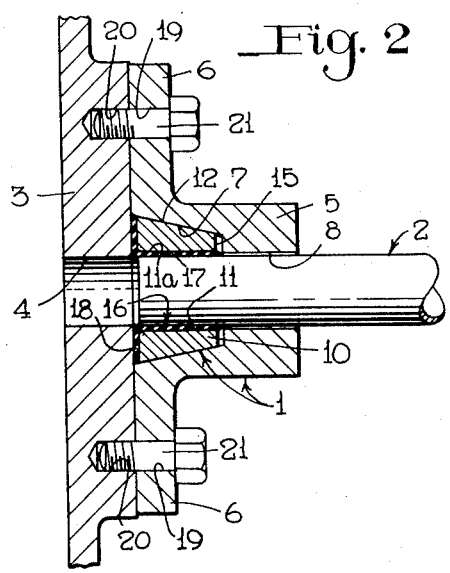
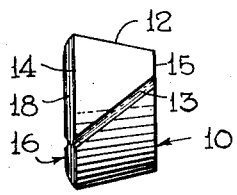
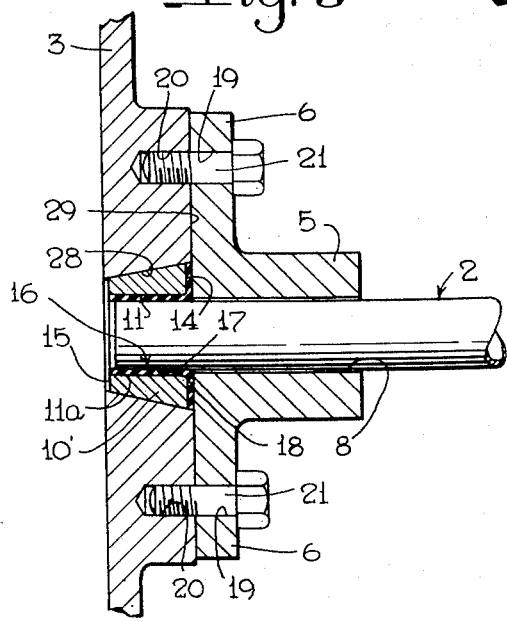
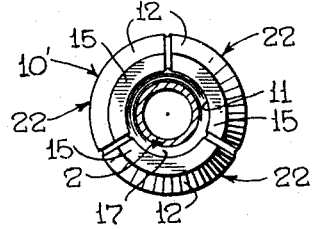
INVENTOR.
Henry I. Rittle
BY
Adelbert A. Steinmiller
ATTORNEY

United States Patent Office 2,819,099
Patented Jan. 7, 1958

2,819,099

FLANGE UNION FITTING WITH CONTRACTIBLE LINED WEDGE

Henry I. Rittle, Pitcairn, Pa., assignor to Westinghouse Air Brake Company, Wilmerding, Pa., a corporation of Pennsylvania Application June 12, 1953, Serial No. 361,168

1 Claim. (Cl. 285—159)

This invention relates to pipe fittings and more particularly to pipe fittings adapted for securing an unthreaded pipe to a device having an opening with which said pipe is to communicate.

An object of the invention is to provide an improved, reinforced fitting of the above type.

Another object of the invention is to provide a pipe fitting which will establish a pressure-tight fluid communication between an unthreaded pipe and a device despite minor variations in the length or diameter of said pipe.

Other objects and advantages of the invention will become apparent from the following, more detailed description thereof.

In the accompanying drawing, Fig. 1 is a longitudinal, sectional view of the improved fitting in a partially-assembled state, shown in association with the unthreaded end of a pipe; Fig. 2 is a longitudinal view, partly in section and partly in outline, of the pipe fitting shown associated with a pipe sealed and secured to a device through the medium of said fitting; Fig. 3 is an elevational view of a sealing element portion of said fitting; Fig. 4 is an end view of another embodiment of said sealing element portion shown mounted on a pipe; and Fig. 5 is a longitudinal view, partly in section and partly in outline, of another embodiment of the improved pipe fitting shown associated with said pipe and a device.

Referring to Figs. 1 and 2 in the drawing, the improved pipe fitting, which is designated generally by the reference numeral 1, is provided for connecting an unthreaded pipe 2 to a wall 3 of a device, such as a reservoir (not shown), having an opening 4, extending through said wall, with which said pipe is to communicate.

The fitting 1 comprises a body 5, preferably cylindrical, having a flange 6, which may be annular in form, formed integrally about its one end. The cylindrical body 5 has a coaxially arranged tapered annular recess 7 which extends reducingly a certain distance inwardly from its flanged end and also has a pipe accommodating bore 8 extending inwardly from the opposite end of body 5 into coaxial, radially offset junction with the innermost, smaller end of the tapered recess 7.

A relatively hard, such as metal, compression element 10 is provided for radial compression in encirclement of the unthreaded periphery of the pipe 2 under action of a radial compressive force exerted on the outer periphery of said element by the tapered surface 7 of the body 5. The compression element 10, preferably in the form of a truncated cone, has a central bore 11 coaxially alignable with, but of slightly larger diameter than, the bore 8, for reasons which will become apparent from subsequent description. The element 10 also has a circumferential surface 12 of the same taper as that of the recess 7 in body 5, the longitudinal width of said element being less than the depth of said recess, however, for reasons to be brought out subsequently.

As shown in Fig. 3 of the drawing, the compression element 10 has a slot 13, cut preferably at an angle (though it may be cut longitudinally, if desired), through the surface 12 to the bore 11 and extending from a base end 14 of said element to its opposite end 15, thereby splitting said element to allow same to be radially compressed for reasons which will be understood from subsequent description of assembly.

Referring again to Figs. 1 and 2 of the drawing, a relatively soft and resilient sealing element 16, formed of material such as rubber or a plastic compound, comprises a sleeve 17 and at one end thereof an integrally attached outwardly directed radial flange 18. The element 16 is preferably bonded to element 10, the sleeve 17 being bonded about the wall of bore 11 and the flange 18 bonded to the base end 14, although the element 16 may, if desired, be separate from the element 10 and inserted into the bore 11 from the base end 14. In its detached state, the outer diameter 11a of sleeve 17 is substantially equal to the inner diameter 11 of element 10 when fully compressed, with groove 13 closed. During bonding, the element 10 is preferably maintained fully compressed to hold the slot 13 closed, so that, after completion of bonding and release of such compression, the portion of the element 16 overlying the groove 13 will be pre-stretched by circumferential expansive spring action of element 10 in widening groove 13 to minimize the tendency of such overlying portion of element 16 to flow into said slot and interfere with radial compression of said element when a compressive force is again exerted on said element.

It is preferable that the inner surface of the sleeve 17 of element 16 initially be curved to produce respective rounded openings at opposite ends of said sleeve converging radially inward to a central opening of minimum diameter substantially equidistant between said opposite ends. The diameter of the central opening is preferably slightly smaller than the outer diameter of the pipe 2 to be accommodated by the fitting, while the rounded openings at opposite sides of said central opening are preferably of larger diameter than the outer diameter of said pipe. When, during initial assembly of the improved fitting on to the pipe 2, the compression element 10, including element 16, are slipped onto said pipe, by virtue of the curvature of the inner surface of sleeve 17, said sleeve 17 will be initially in slight compressive engagement with the outer surface of the pipe in the immediate vicinity of the central opening, with clearances X and Y existent between the sleeve and pipe at the opposite rounded openings. The slight compressive engagement effected between sleeve 17 and pipe 2 during initial assembly prevents accidental removal of the assemblage 9, 10 from the pipe 2 as by jarring or bumping during subsequent assembly operations, while the clearance spaces X and Y allow for displacement of the resilient sealing element material along the axis of the pipe during radial compression of the sleeve 17 around the pipe 2.

It is also preferable that the end surface of the flange 18 of element 16 be curved to allow for radial displacement of resilient flange material within the confines of the peripheral edge of surface 18 on element 10 during compression of said flange between wall 3 and said element 10.

Referring now to Fig. 2 of the drawing, the flange 6 is provided with a plurality of longitudinal holes 19 which are so disposed as to be alignable, when the bore 8 is coaxially aligned with the opening 4, with such as tapped holes 20 formed in the wall 3 to adapt the fitting 1 for connection to said wall, as through the medium of tap bolts 21.

In assembly, the body 5 is slipped over the end of the pipe 2 to a position such that said pipe at its unthreaded end extends completely through and beyond the bore 8 and tapered recess 7. The compression element 10, including element 16, is then introduced onto and moved by relatively light hand pressure over the end of the pipe 2 until the end of said pipe is substantially even with the base end 14 of said element, the sleeve 17 yielding, as required, to permit such movement.

The compression element 10 and the end of pipe 2 disposed therein are then preferably positioned such that the flange 18 of sealing element 16 is substantially in abutment with the adjacent face of the wall 3 of the reservoir, whereupon the body 5 is moved toward said wall and rotated about said pipe until the holes 19 are in alignment with the holes 20 in said wall.

The tap bolts 21 are then inserted through the respective holes 19 and tightened into screw-threaded engagement with the tapped holes 20, thereby drawing the body 5 toward the wall 3 of the reservoir and into contact with the surface 12 of compression element 10. As the studs 21 are further tightened, by virtue of engagement between the tapered surfaces 7 and 12 of body 5 and element 10, respectively, the flange 18 of sealing element 16 is compressed between the base end 14 of element 10 and the adjacent face of wall 3, forming a tight seal therebetween, while the compression element 10 is forced into the tapered recess 7 compressing said element 10 radially inward as permitted by slot 13 and thereby causing the sleeve portion 17 to compress tightly around the outer periphery of the pipe 2 with sufficient force to assure a fluid-tight seal and prevent easy removal of said pipe from the bore 11.

Use of a segmental compression element 10' illustrated in Fig. 4 in the drawing may be preferred to that of the single split type such as the element 10 described in connection with Figs. 1 and 2. In general overall configuration the element 10' will conform with the element 10 and will accommodate use of the sealing element 16 previously described. Insofar as the two elements 10 and 10' are alike, the same reference numerals are employed in the drawing to designate corresponding surfaces etc. of said elements and description of such configuration is not repeated herein.

Referring particularly to Fig. 4, in which the alternate form of the compression element 10' is shown in outline as viewed from its smaller annular end 15, with sealing element 16 attached, and the assemblage of elements 10' and 16 mounted in encirclement of the pipe 2, which is shown in cross-section; the element 10' is divided into a plurality of circumferential segments 22 held together to form a continuous tapered ring by bonded attachment to said sealing element.

During bonding of the sealing element 16 to the compression element 10', the segments 22 are held together about the sleeve 17 of element 16 to form a continuous ring, with the larger annular end 14 of said ring in contact with the inner flat annular surface of the flange 18 of element 16; the inner diameter 11 of the ring formed by the abutting segments being substantially equal to the outer diameter 11a of the sleeve 17 so that upon completion of the bonding process, and release of the segments from external support, such segments will be held in proximity of each other through the medium of the sealing element 16 to which they are bonded.

In contrast to employment of element 10 as described in connection with Figs. 1 and 2 where initial circumferential expansion of the element 10, subsequent to its being bonded to element 16, occurs substantially as a result of the spring action of said element 10 when released subsequent to the bonding operation, separation of the segments 22 of the element 10' to allow for subsequent radial compression of the resilient sleeve 17 during tightening of the fitting and pre-stretching of the sealing element material at points of separation of said segments is effected during introduction of the compression and sealing element assemblage 10', 16 to the end of the pipe 2. Such introduction is attained by forcing the assemblage 10', 16 onto the end of the pipe via, initially, one or the other of the rounded openings at opposite ends of the sleeve 17 of element 16 comprised in said assemblage, whereby said element is forced to stretch along the path of division between segments 22, thereby causing separation of said segments, and spaced-apart disposition in encirclement of said sleeve upon the proper positioning of said assemblage onto said pipe.

As in the case of the element 10 described in connection with Figs. 1 and 2, subsequent radial compression of the sleeve 17 into sealing engagement with the outer surface of pipe 2 as well as compressing of sealing flange 18 into sealing engagement with such as the wall 3 is effected by slidable engagement between the tapered surface 12 and such as the corresponding surface 7 of the body 5, as will be apparent from the preceding description of assembly of the fitting taken in connection with Figs. 1 and 2.

According to an alternate embodiment of the fitting shown in Fig. 5, there is no tapered recess 7 in body 5, and the bore 8 for accommodating the pipe 2 is continued into intersection with the face of the flange 6, while a tapered recess 28, corresponding to recess 7 in body 5 is provided in the wall 3 for engagement with the tapered surface 12 of the compression element 10 or 10' to cause the radially inward compression of the sleeve 17 of sealing element 16 around the pipe. In such alternate embodiment, the tapered recess 28 in wall 3 extends reducingly inward from the body flange seating surface 29 on said wall, so that the compression and sealing element assemblage 10, 16, or 10', 16 is mounted on the pipe with the smaller end 15 forward for insertion into said recess. Advancement of such assemblage 10, 16, or 10', 16 is then effected by engagement between the sealing flange 18 of element 16 and the face of flange 6 as said flange is pulled into engagement with surface 29 on wall 3 by tightening of the tap bolts 21.

In its assembled and tightened state in which it is shown in Fig. 5, the alternate embodiment of the novel fiting provides for a fluid-tight seal between the outer diameter of the pipe 2 and the bore 8 in the body 5 as well as between the wall 3 and the flange 6 of said body. Leakage of fluid under pressure from the pipe 2 back through tapered opening 28 via such as the nearly closed slot 13, in the case of use of the element 10, or via the nearly closed spaces between the segments 22, in the case of use of elements 10', is prevented by sealing engagement of the outer peripheral edge of the respective sealing flange 18 with the wall of said recess near its larger end.

Summary

It will now be seen that the invention provides an improved, reinforced pipe fitting adapted to accommodate minor variations in pipe length and pipe diameter and to connect such a pipe in tight sealing engagement with a device, such as a reservoir, having an opening with which said pipe is to communicate. In both embodiments of the invention, the improved fitting has a sealing element, in which the pipe is disposed, which is adapted to be tightened against the wall of such as said reservoir thereby causing a resilient material bonded to both the reservoir engaging face and the pipe engaging face of said sealing element to be compressed and form a pressure-tight seal between said pipe and said reservoir.

Having now described my invention, what I claim as new and desire to secure by Letters Patent is:

A pipe fitting comprising, in combination, two members having parallel engaging faces and at right angles to said faces coaxially aligned bores, respectively, one of said bores supportably accommodating a pipe for fluid pressure communication with the other of said bores, and only one of said members having a tapered bore extending reducingly inward from its said engaging face into coaxial communication with its respective bore; a longitudinally split, truncated cone-shaped, relatively hard resilient element having a pipe-accommodating bore extending axially therethrough, said truncated element being in a radially compressed state of wedging outer peripheral engagement with the wall of said tapered bore in consequence of its forced insertion into said tapered bore; a resilient sealing element comprising a sleeve portion bonded to the wall of said pipe-accommodating bore and having sealing engagement with the outer periphery of said pipe, said sealing element also comprising an annular flange portion formed integrally with one end of said sleeve portion and bonded to the larger end of said truncated element and compressed by abutting engagement with engaging face of the other of said members, said sealing element being bonded to the wall of said pipe-accommodating bore and to said larger end of said split truncated element prior to insertion of said split truncated element into said tapered bore and while the latter is held in a radially compressed state such that after such bonding and release of such radial compression the portion of said resilient sealing element overlying the split in the truncated element will be prestretched by radial expansion of said truncated element for minimizing the tendency of such overlying portion to flow into such split and interfere with radial compression of said truncated element upon its said forced insertion into said tapered bore; and means for causing relative translational movement of said members toward each other so as to effect said forced insertion for thereby effecting a pressure-tight connection between said pipe and said members.

References Cited in the file of this patent

UNITED STATES PATENTS

| | | |
|---|---|---|
| 808,922 | Herrick | Jan. 2, 1906 |
| 969,492 | Peeples | Sept. 6, 1910 |
| 1,304,126 | Venable | May 20, 1919 |
| 1,762,721 | Klingner | June 10, 1930 |
| 1,822,637 | Young | Sept. 8, 1931 |
| 2,111,419 | Crotty | Mar. 15, 1938 |
| 2,562,359 | Iredell | July 31, 1951 |
| 2,585,453 | Gallagher | Feb. 12, 1952 |
| 2,704,676 | Harding | Mar. 22, 1955 |
| 2,768,846 | Gratzmuller | Oct. 30, 1956 |

FOREIGN PATENTS

| | | |
|---|---|---|
| 752,353 | France | July 17, 1933 |
| 402,557 | Italy | Mar. 13, 1943 |